(12) United States Patent
Patel et al.

(10) Patent No.: US 7,367,509 B2
(45) Date of Patent: May 6, 2008

(54) METHODS AND APPARATUS FOR SWIPE OR PRESENTATION IMAGE SCANNING

(75) Inventors: Mehul Patel, Fort Salonga, NY (US); Thomas Bianculli, Manorville, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 246 days.

(21) Appl. No.: 11/025,817

(22) Filed: Dec. 29, 2004

(65) Prior Publication Data

US 2006/0138240 A1    Jun. 29, 2006

(51) Int. Cl.
*G06K 7/10* (2006.01)
(52) U.S. Cl. .............. 235/462.01; 235/462.01
(58) Field of Classification Search ........... 235/472.01, 235/462.01
See application file for complete search history.

(56) References Cited

U.S. PATENT DOCUMENTS

| | | | | |
|---|---|---|---|---|
| 4,766,297 | A * | 8/1988 | McMillan | 235/462.07 |
| 5,491,346 | A * | 2/1996 | Sussmeier | 250/568 |
| 5,679,941 | A * | 10/1997 | Iizaka et al. | 235/383 |
| 5,923,017 | A * | 7/1999 | Bjorner et al. | 235/385 |
| 6,805,449 | B2 * | 10/2004 | Hecht | 353/85 |
| 6,880,759 | B2 * | 4/2005 | Wilde et al. | 235/462.31 |
| 7,111,786 | B2 * | 9/2006 | Schmidt et al. | 235/462.45 |
| 2002/0067422 | A1 * | 6/2002 | Miura et al. | 348/370 |

* cited by examiner

*Primary Examiner*—Karl D. Frech
(74) *Attorney, Agent, or Firm*—Fay Kaplun & Marcin, LLP.

(57) ABSTRACT

Methods and apparatus for swipe image scanning comprising a scan stand and an imaging scanner. An exemplary scan stand comprises an illumination module and a receiving structure to receive the imaging scanner. Other embodiments further comprise a scan module, an illumination module, a processing unit, a detection component and memory. In an embodiment, the scan stand illuminates target dataforms brighter than the illumination from the scanner allowing for shorter exposure times and improved scanner performance.

10 Claims, 6 Drawing Sheets

METHODS AND APPARATUS FOR SWIPE OR PRESENTATION IMAGE SCANNING

FIELD OF THE INVENTION

The invention is directed to methods and apparatus for scanning objects and, more particularly to a system for providing swipe or presentation image scanning.

BACKGROUND OF THE INVENTION

There are numerous standards for encoding numeric and other information in visual form, such as the Universal Product Codes (UPC) and/or European Article Numbers (EAN) used to identify products sold throughout the world. These numeric codes allow businesses to identify products and manufactures, maintain vast inventories, and manage a wide variety of objects under a similar system and many other functions. The UPC or EAN of the product is printed, labeled, etched, or otherwise attached to the product as a dataform.

Dataforms are any indicia that encode numeric and other information in visual form. For example, dataforms can be barcodes, two dimensional codes, marks on the object, labels, signatures, signs etc. Barcodes are comprised of a series of light and dark rectangular areas of different widths. The light and dark areas can be arranged to represent the numbers of a UPC. Additionally, dataforms are not limited to products. They can be used to identify important objects, places, etc. Dataforms can also be other objects such as a trademarked image, a person's face, etc.

Dataforms are decoded by scanners. The scanners can be coupled to another device, such as, for example, a cash register or a mobile computer, for further processing of the captured dataform. There are many different types of scanners, for example, laser based scanners, imaging based scanners, presentation or swipe scanners, handheld scanners, etc. Some scanners can have dual modes. For example, a handheld scanner can be configured to operate in either a stationary presentation mode, where the dataform is presented to the scanner or in a mobile handheld mode, where the scanner is pointed at the dataform. In some configurations the scanner can be securely placed in a stand while in presentation mode.

Presentation or swipe scanners have become very common, but they are mostly based on laser scanning technology. Image scanners have normally not been used in a presentation or swipe mode because the target dataform is usually moving when the dataform is in the field of view of the scanner. The movement of the dataform causes motion blur and the captured dataform image may not be clear. The blurry image results in a failed attempt or a long decode time. Either option is not desirable since, they slow down a checkout or inventory process.

Accordingly, a need exists for methods and apparatus that can assist image scanners with decoding dataforms in a swipe or presentation mode.

SUMMARY OF THE INVENTION

The invention as described and claimed herein satisfies this and other needs, which will be apparent from the teachings herein. An embodiment of the invention includes methods and apparatus for swipe or presentation image scanning.

An exemplary embodiment of the invention comprises, a scan stand for a scanner comprising an illumination system, comprising a scan stand illumination module and/or a scanner illumination module, and a receiving structure for receiving and supporting the scanner. The combination of the scan stand illumination module and the scanner illumination module in a second mode provides an illumination greater than the scanner illumination module in a first mode. In alternate embodiments, the scan stand further comprises a detection component for activating the illumination medium of the scan stand. The illumination module can be, in some embodiments, a light emitting diode (LED), and the scanner may comprise more than one LED. Additionally, the stand can be configured to mount the scanner horizontally or vertically.

In an embodiment of the invention, the detection component of the scan stand is implemented as a photodiode. The photodiode detects when an attached scanner is emitting light and correspondingly activates the scan stand illumination module. In other embodiments, the scan stand illumination can be activated by a button or switch, or the scanner and the stand can be electrically coupled and send signals to each other. The button or switch can be positioned inside the receiving structure so that it is pressed or switched when a scanner is placed in the stand. Alternatively or in addition, a button or switch can be positioned anywhere else on the stand and manually turned on and off by an operator, or in an alternate embodiment, the illumination can be left constantly on and never switched by any means.

The additional illumination provided by the scan stand allows the scanner to decrease its exposure time and thus decrease the blurriness of moving targets in captured images. Therefore, an exemplary scanner implemented in accordance with the invention comprises a scan module, a processing unit, a detection component for detecting the coupling of the scanner to a scan stand and memory. The memory comprising a method stored thereon for decreasing the exposure time of the scanner when the detection module is activated.

Other objects and features of the invention will become apparent from the following detailed description, considering in conjunction with the accompanying drawing figures. It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference numerals depict like elements throughout the several views.

DETAILED DESCRIPTION OF EXEMPLARY EMBODIMENTS

There will now be shown and described in connection with the attached drawing figures several exemplary embodiments of methods and apparatus for swipe or presentation scanning.

In an exemplary embodiment of a system implemented in accordance with the invention, a handheld imaging scanner is coupled to a powered scan stand in a swipe or presentation mode. The scan stand comprises an illumination module that is brighter than the illumination provided by the scanner. The extra illumination provided by the stand enables the scanner to have a shorter exposure time. Reducing the exposure time of the scanner reduces the amount of blur in a captured image of an object. Capturing cleaner images of the object makes it easier to decode any dataforms on the object and thus increases the performance of the scanner. In some embodiments of the invention, the scanner may comprise a variable exposure time. For example, the scanner uses a longer exposure time in a handheld mode, and a shorter exposure time in presentation mode.

In various embodiments of the invention, the operation of the illumination module can be configured to operate in various modes, depending on the stand and the scanner. For example, the stand may be configured to activate its illumination module when an attached scanner's illumination module is activated. This can be achieved by positioning the illumination module of the scanner in the vicinity of a photodiode. When the photodiode detects the activation of the scanner's illumination module, the stand activates its illumination module.

Alternatively, the scan stand may comprise a button or switch that activates the stand's illumination module. The switch can be located in a receiving structure for the scanner so that the switch is turned on, when a scanner is coupled to the stand. In another embodiment, the button or switch can be located anywhere else on the stand, and switched on or off by a scan stand operator.

In some embodiments, the scanner can be electrically or wirelessly coupled to a scan stand so that they can communicate signals to each other. In this example, the scanner can transmit a signal to a detection component of a scan stand, or the scan stand can be configured to automatically sense a coupled scanner. Further signals and/or messages can be communicated between the scanner and the stand, such as, for example, when the stand should activate its illumination module.

Figure 1:
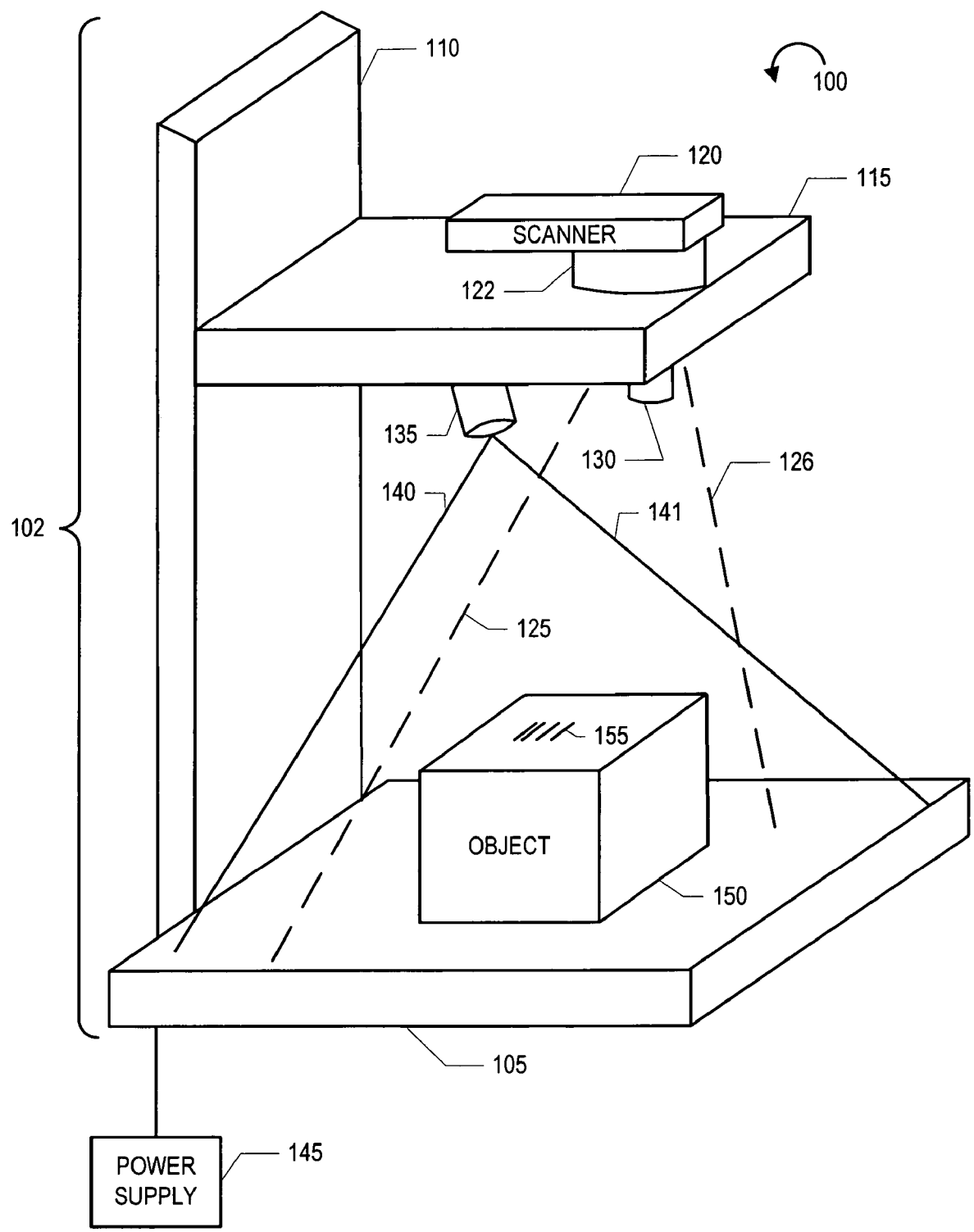
FIG. 1 illustrates an exemplary system for implementing swipe imaging scanning implemented in accordance with the invention, wherein the imaging scanner is mounted horizontally on the scan stand.

FIG. 1 illustrates a three dimensional drawing of an exemplary swipe or presentation imaging system 100 comprising an imaging scanner 120 coupled to a powered scan stand 102. The scan stand comprises a base 105, a vertical support member 110 and a horizontally extending scanner support member 115. Scanner support member 115 extends from the vertical support member 110 and is positioned above the base 105, creating a scanning region under the scanner support member 115.

In some embodiments, the scan stand 102 can be coupled to an external structure or device, such as, for example a counter and/or a cash register. The external device can be used as the vertical support member in some embodiments. The scan stand 102 can be coupled to an external power supply 145, as illustrated in FIG. 1, but in other embodiments the stand 102 can have a host power supply, draw power from the scanner 120 and/or receive power from the device to which the scanner or stand is connected. The power can be received through, for example, a CAT5 cable, a universal serial bus (USB), etc.

The scanner support member 115 comprises a receiving structure 122. The receiving structure 122 is shaped to secure a handheld scanner 120 to the stand 102. The scanner 120 and the stand 102 can be coupled together by friction, interlocking nubs, a locking mechanism, etc. The receiving structure illustrated in FIG. 1 is implemented as a raised structure, but in other embodiments, the receiving structure can be sunken into the scanner support member 115. In some embodiments, the scanner 120 and the stand 102 have a flush appearance, when they are coupled together. The scanner 120 can be detached using a release button or spring loaded configuration. A see through region is formed in the receiving structure 120 and continues through the scanner support member 115, so that the scanner 120 can scan objects in the scanning region. In alternate embodiments, the receiving structure 122 may be positioned so that the reading portion of a coupled scanner 120 extends off an edge of the scanner support member 115, and can thus scan objects in the scanning region.

Scanner support member 115 also comprises an illumination module 135. In an embodiment, the illumination module 135 emits light that is brighter than the illumination provided by the scanner 120, and can be implemented as one or more LEDs, halogen lamps, xenon lamps, etc. In alternate embodiments, the illumination module 135 has an intensity equal to or less than the illumination module of the scanner, and when used in conjunction in an illumination system, the scanner's illumination module and the stand's illumination module 135 provide illumination that is greater than that of just the scanner's illumination module. The illumination provided by the illumination module 135 is illustrated as the region created by the solid lines 140 and 141. In this embodiment, the illumination region mostly encompasses the field of view of the scanner 120, which is depicted as the region created by dashed lines 125 and 126. In an exemplary operation of the system 100, when an object 150 comprising a dataform 155, for example a barcode 155, is passed within the field of view of the scanner 120, the illumination module 135 illuminates the object 150 allowing the scanner 120 to take an image of the object and analyze its barcode 155. Some embodiments of the invention comprise more than one illumination module 135.

Scanner support member 115 further comprises a detection component for determining when a scanner is coupled to the stand and/or when to activates its illumination module. The stand 102 illustrated in FIG. 1 comprises a photodiode 130, for detecting when the scanner's 120 illumination module 135 is activated. The illumination module 135 is configured to turn on when the photodiode 130 senses illumination from a coupled scanner 120. Although the photodiode is illustrated as hanging from the scanner support member 115, the photo diode can be placed in the receiving structure 122 closer to the illumination module of the scanner 120.

In some exemplary imaging scanners, the illumination module blinks at a high rate to try and freeze moving objects when an image is taken. The scan stand illumination module 135 can be configured to match the blinking illumination provided by the scanner. Additionally, the scanner can be configured to compensate its exposure timing for any delay there may be between the scanner's illumination module and the stand's illumination module 135.

Figure 3:
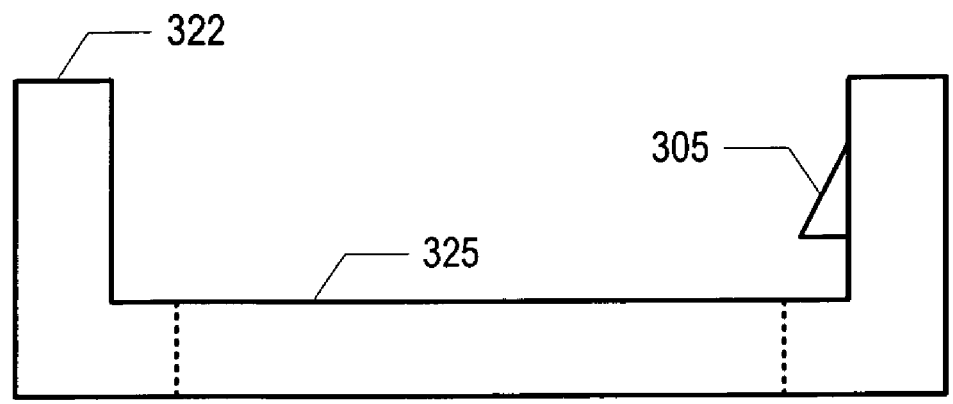
FIG. 3 illustrates an exemplary receiving structure having a scanner detection button, implemented according to an embodiment of the invention.
Figure 4:
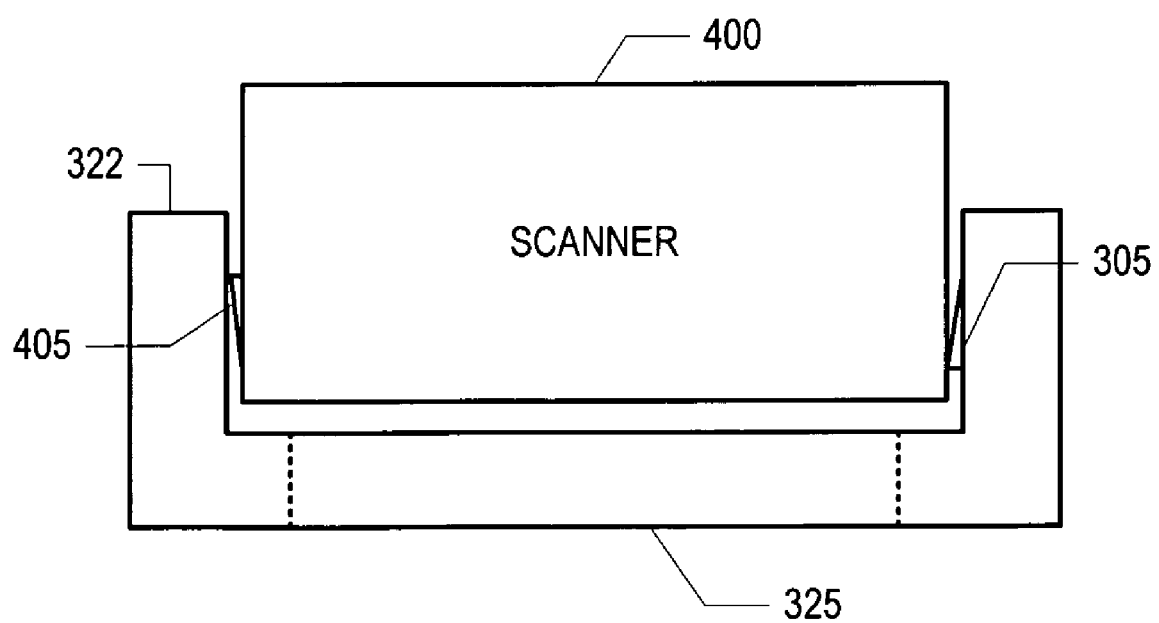
FIG. 4 illustrates an exemplary scanner comprising a mode-switching button coupled to an exemplary receiving structure.

FIG. 3 illustrates an alternate receiving structure 322, implemented in accordance with the invention. The receiving structure comprises a see through region 325 and a detection component 305. In this embodiment the detection component is implemented as a button or switch 305. FIG. 4 illustrates the receiving structure 322, with a coupled scanner 400. When the scanner 400 is placed in the receiving structure 322, the button 305 is automatically depressed and the scan stand detects the coupled scanner 400. The scan stand can then activate its illumination module. The scan stand can also comprise an additional power switch that can turn off the illumination medium even when a scanner 400 is coupled to the stand.

While the scan stand is depicted in FIG. 1 with an imaging scanner, other types of scanners, such as laser scanners can be used with the scan stand 102. Additionally, other devices such as a personal digital assistant (PDA), or other computing device with or without a scan engine can be used with the scan stand 102.

Scanner 400 comprises a switch 405 that is automatically pressed when the scanner 400 is coupled to the receiving structure 322. The pressed switch 405 can put the scanner in a presentation mode. For example, in a presentation mode, the scanner 400 can reduce its exposure time, turn off its illumination module, in a button detection embodiment, reduce its illumination intensity, in a photodiode detection embodiment, increase its illumination intensity, etc. Although FIG. 4 illustrates the scanner 400 coupled to a receiving structure with a switch 405, an imaging system that uses a photodiode for detection can comprise a scanner with a similar switch 405. In an embodiment of the invention, where the scanner 400 is a gun shaped scanner 400, the switch 405 can be the trigger of the scanner 405. The receiving structure 322 can be shaped to press the trigger when a scanner 400 is inserted, and the scanner 400 can be programmed to switch to a presentation mode if the trigger is pressed for a certain amount of time. In other embodiments, a scanner does not comprise a switch and is switched to a presentation mode when the scanner reads a parameter dataform.

In some embodiments of the scanning system of the invention, the scanner and the stand can be electrically or wirelessly coupled to each other. The system uses the communication channel created by the coupling to send messages and or signals. In this embodiment, the scanner and the stand comprise additional hardware and/or software to facilitate the communication. The initiation of the communication channel can be used as a detection component to turn on the scan stand illumination module and/or switch the scanner to a presentation mode. If the scanner is electrically coupled to the stand, in the some embodiments, the scanner can be configured to recharge itself on the stand or the stand can draw power from the scanner. Alternatively, the communication channel can be used to transmit signals directing the stand when to activate its illumination module. The swipe scanning system of the invention can comprise the electrical or wireless communication channel in addition to the other detection techniques previously described.

Figure 2:
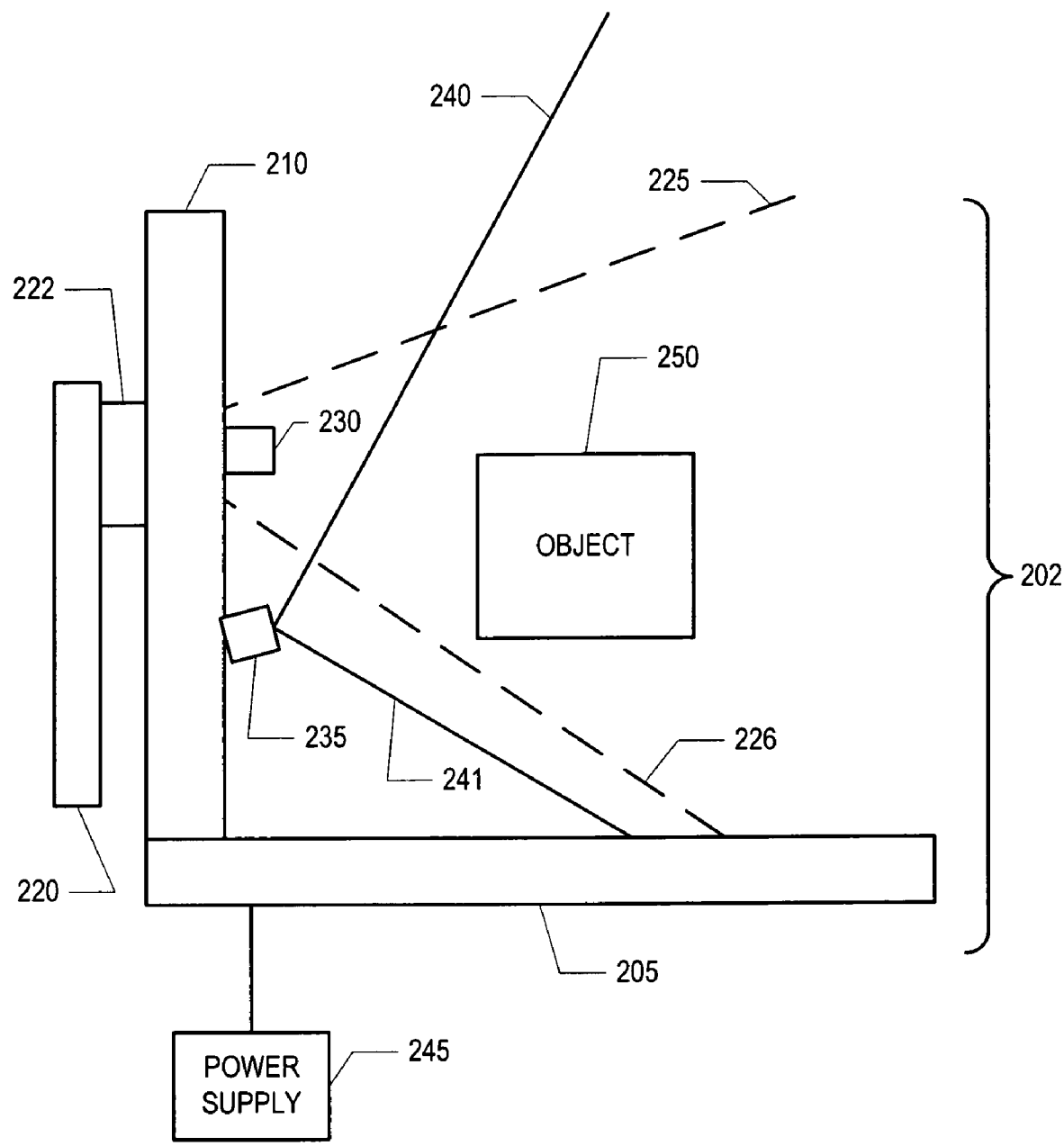
FIG. 2 illustrates an exemplary system for implementing swipe imaging scanning implemented in accordance with the invention, wherein the imaging scanner is mounted vertically on the scan stand.

FIG. 2 illustrates an alternate embodiment of the invention where the scanner 220 is coupled vertically to a scan stand 202. The scan stand 202 comprises a base 205 and a vertical support member 220. The scanner 220 is coupled to the stand 202 via a receiving member 222 that is part of vertical support member 220. Scan stand 202 is powered by power supply 245. The vertical support member 210 also comprises a photodiode 230 and an illumination module 235. The illumination module creates an illumination region bounded by solid lines 240 and 241, and mostly encompasses the field of view of the scanner 220. An object 250 can then be swiped or presented in the field of view of scanner for analysis.

Figure 5:
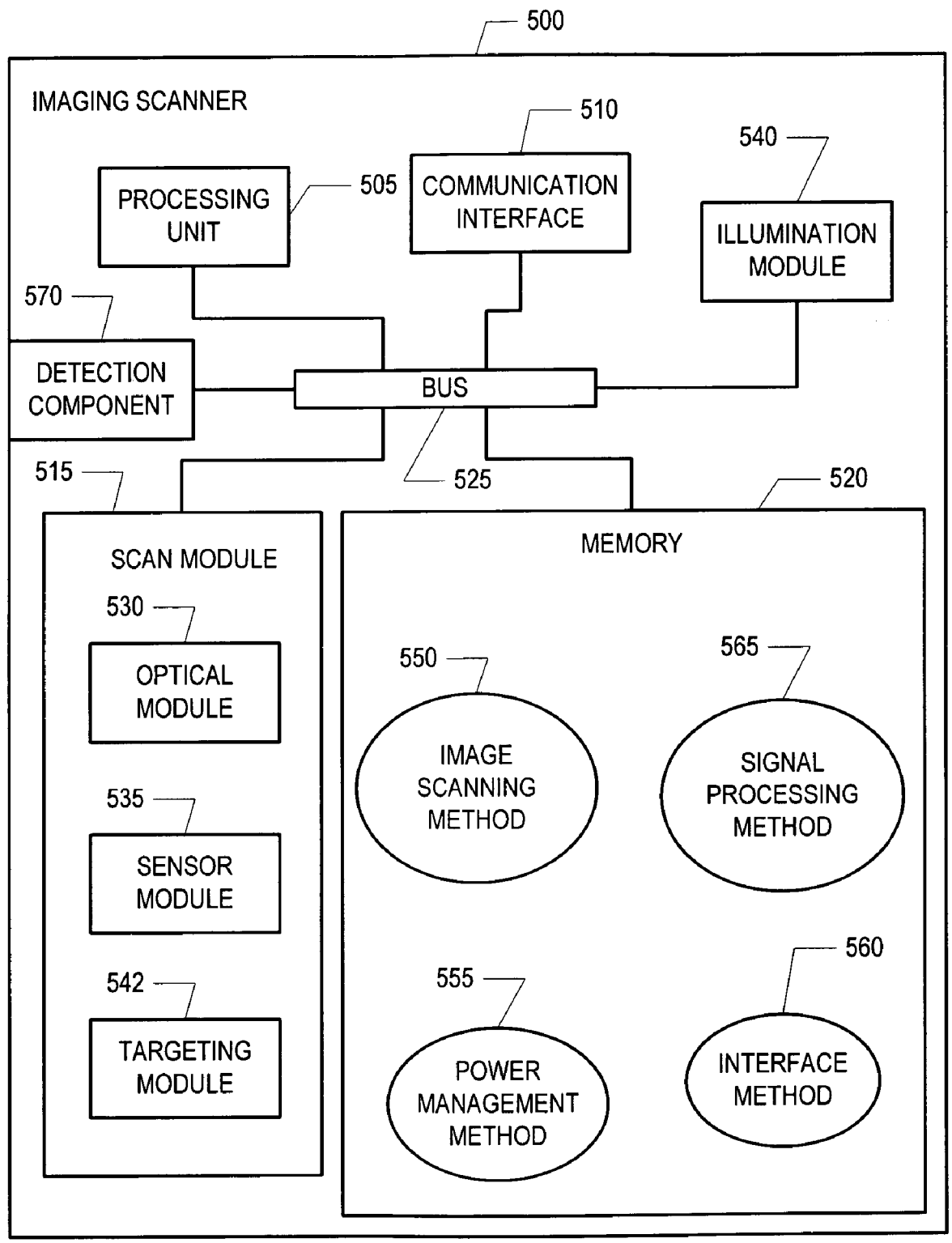
FIG. 5 illustrates an exemplary imaging scanner implemented according to an embodiment of the invention.

FIG. 5 illustrates a block diagram of an exemplary imaging scanner 500 implemented in accordance with the invention. The scanner can be, in an exemplary embodiment, a multi-mode handheld scanner, a stationary scanner, a module of a mobile computer, etc. Scanner 500 comprises processing unit 505, scan module 515, memory 520, communication interface 510, illumination module 540 and detection component 570 coupled together by bus 525. The modules of scanner 500 can be implemented as any combination of software, hardware, hardware emulating software, and reprogrammable hardware. The bus 525 is an exemplary bus showing the interoperability of the different modules of the invention. As a matter of design choice there may be more than one bus, and in some embodiments, certain modules may be directly coupled instead of coupled to a bus 525.

Processing unit 505 can be implemented as, in exemplary embodiments, one or more Central Processing Units (CPU), Field-Programmable Gate Arrays (FPGA), etc. In an embodiment, the processing unit 505 can comprise a general purpose CPU that processes software and raw image data stored in memory 520. In other embodiments, instead of storing methods in memory 520, the processing unit 505 comprises multiple units that are preprogrammed to perform desired functions, such as, for example, data capture, signal processing, interface emulation, etc. In alternate embodiments, one or more modules of processing unit 505 can be implemented as an FPGA that can be loaded with different processes, for example, from memory 520, and perform a plurality of functions. Processing unit 505 can comprise any combination of the processors described above.

The illumination module 540 may be implemented, in one non-limiting exemplary embodiment, as one or more LEDs. Other illumination mediums may be used in alternate embodiments. Scan module 515 can be implemented as, in one exemplary embodiment, a camera 515 comprising an optical module 530, a sensor module 535 and optionally a targeting module 542. The optical module 530 can be, for example, the lens 530 of the camera 515. In some embodiments, the optical module 530 can comprise of more than one lens and/or provide more than one focus point. In addition, the optical module 530 is not limited to lenses; any prism and/or other optical medium that is suitable for capturing images can be used to implement the optical module 530.

The sensor module 535 can be implemented, in one exemplary embodiment, as a Charged-Coupled Device (CCD). The CCD 535 records images in digital format for processing. In alternate embodiments, any sensor that captures images can be used to implement the sensor module 535, such as, for example, CMOS semiconductors.

Some embodiments of the invention may comprise a targeting module 542. The targeting module 542 comprises a light source or sources, for example, a laser, that projects a target approximating the field of view of the imaging scanner 500. The target appears on an object as a crosshair, a square, a circle, or any other design that can assist the user in placing the dataform in the field of view of the scanner.

Memory 520 can be implemented as volatile memory, non-volatile memory and rewriteable memory, such as, for example, Random Access Memory (RAM), Read Only Memory (ROM) and/or flash memory. The memory 520 stores methods and processes used to operate the imaging scanner 500, such as, image scanning method 550, signal processing method 565, power management method 555 and interface method 560. The memory 520 can also be used to store raw image data and/or processed image data.

When a scanning operation is initiated, for example a trigger is pressed, or the scanner is placed in a presentation mode, the scanner 500 begins image scanning method 545. The data captured can be a digital image of an object comprising dataform information. During image scanning method 545, scan module 515 captures images within the field of view of the scanner 500, and the images are analyzed and decoded by signal processing method 565.

Power management method 555 manages the power used by the scanner 500. In some embodiments, the scanner 500 can switch to a power save mode, when no activity is detected for a given amount of time. The power save mode can completely shut down the scanner 500 or initiate other power saving techniques.

Imaging scanner 500 can be coupled to many different devices that can communicate in a variety of languages. Therefore, imaging scanner 500 comprises an interface method 560 that translates the decoded dataform into the language of the device that interfaces with the scanner 500. Different interfaces include Universal Serial Bus (USB), scanner emulation, IBM keyboard wedge, Symbol Serial Interface (SSI), etc. Communication is performed through communication interface 510. Communication interface 510 can be implemented as a port, an antenna, etc.

In some embodiments, the scanner 500 comprises its own detection component 570. The detection component 570 can be implemented as a switch, a button, a trigger, an electrical connection, or in some embodiments, integrated with communication interface 510. In a switch embodiment, the switch 570 can be in one of two positions. In a first position, when the scanner is not coupled to a scan stand, the scanner 500 operates in a handheld mode. When the scanner 500 is placed in a receiving structure of a scan stand, the button 570 is automatically pressed into a second position and the scanner 500 operates in a swipe or presentation mode. Alternate embodiments of the detection component 570 can also switch the scanner between modes.

The exemplary embodiment of FIG. 5 illustrates image scanning method 550, signal processing method 565, interface method 560 and power management method 555 as separate components, but these methods are not limited to this configuration. Each method described herein in whole or in part can be separate components or can interoperate and share operations. Additionally, although the methods are depicted in the memory 520, in alternate embodiments the methods can be incorporated permanently or dynamically in the memory of processing unit 505. Memory 520 is illustrated as a single module in FIG. 5, but in some embodiments imaging scanner 500 can comprise more than one memory module. For example, the methods described above can be stored in separate memory modules.

Figure 6:
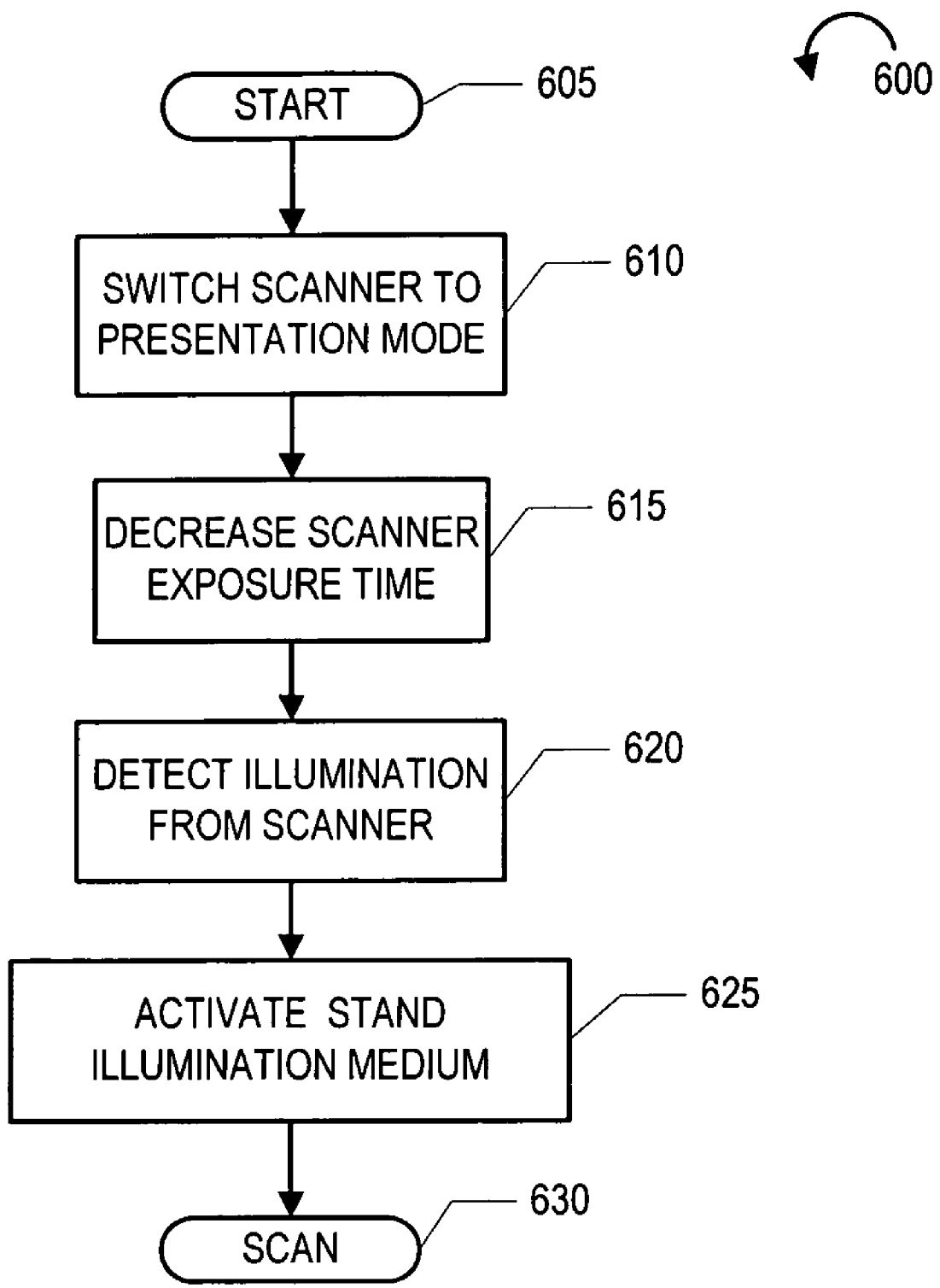
FIG. 6 illustrates an exemplary image scanning method implemented according to an embodiment of the invention.
Figure 7:
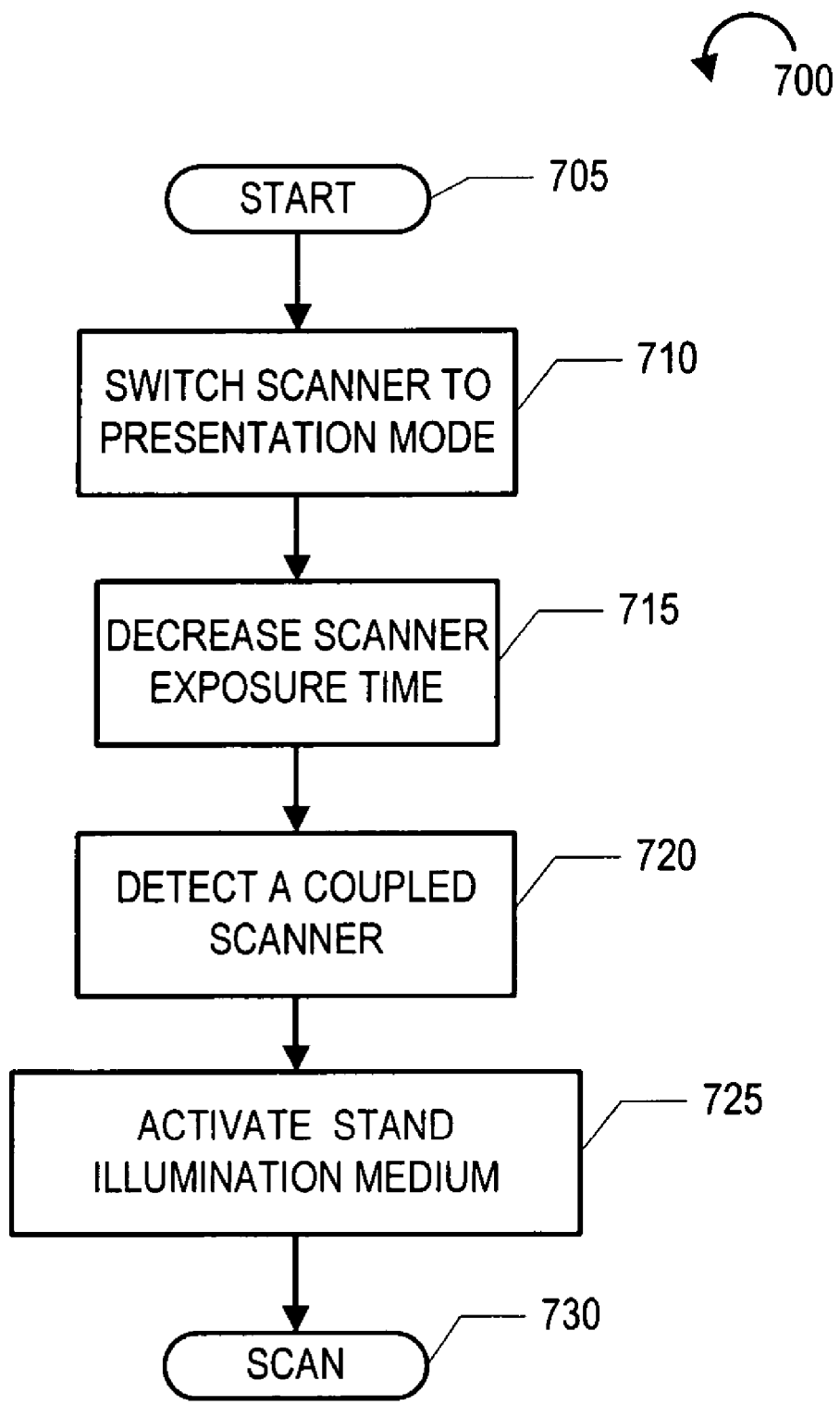
FIG. 7 illustrates an alternate image scanning method implemented according to an embodiment of the invention.

FIGS. 6 and 7 illustrate exemplary image scanning methods 600 and 700, which can be used with the scanning system of the present invention. Method 600 is used with a scan stand detection component implemented as a photo- diode 130, and method 700 is used with a scan stand detection component implemented as a switch 305. The steps of method 600, 700 and other methods described herein are exemplary and the order of the steps can be rearranged.

Image scanning method 600 begins with start step 605. In an exemplary embodiment, the method 600 begins when the scanner 120 is placed in the receiving unit 122 of the scan stand 120. Processing proceeds from step 605 to step 610, where the scanner 120 switches to a presentation mode. For example, following step 610, in step 615 the exposure time for the scanner 120 is decreased. The bright illumination provided by the scan stand illumination module 135 allows the scanner 120 to reduce its exposure time. Decreasing the exposure time produces clearer pictures of moving objects and thus increasing scanning performance in a presentation mode. In some embodiments, the scanner 120 can take further steps such as decreasing the intensity of its own illumination module. In an embodiment of the invention, the scanner's 120 exposure time is decreased by switching from a first decoding algorithm with a predetermined maximum exposure time to a second decoding algorithm with a shorter predetermined maximum exposure time.

Following step 615, processing proceeds to step 620, where the scan stand 102 detects illumination from the scanner 120, for example, through a photodiode 130 or through a signal transmitted over a communication channel. Once illumination is detected, processing proceeds from step 620 to step 625, where the scan stand 102 activates its illumination module 135. Following step 625, in step 630 the scanning system 100 is ready to capture and analyze dataforms.

Method 700, illustrated in FIG. 7, is similar to method 600, but in this exemplary method the detection component 305 is implemented as a switch or a button. Steps 705 through 715 and 725 through 730 of method 700 are similar to steps 605 through 615 and steps 625 through 630 of method 600. The difference between methods 600 and 700 is in step 720, where the scan stand detects a coupled scanner using a button or switch instead of based on the illumination module of the scanner. The button or switch can be located within the receiving structure 322 of a scan stand so that the stand automatically activates its illumination module when a scanner is couple to it.

While there have been shown and described and pointed out fundamental novel features of the invention as applied to preferred embodiments thereof, it will be understood that various omissions and substitutions and changes in the form and detail of the disclosed invention may be made by those skilled in the art without departing from the spirit of the invention. It is the intention, therefore, to be limited only as indicated by the scope of the claims appended hereto.

What is claimed is:

1. A scan stand comprising:
   an illumination system comprising a scan stand illumination module and a scanner illumination module, wherein a combination of said scan stand illumination module and said scanner illumination module in a second mode provides an illumination greater than the scanner illumination module in a first mode;
   a receiving structure, wherein said receiving structure receives and supports a scanner; and
   a detection component wherein said detection component activates the illumination system of said scan stand, and wherein said detection component is one of a photodiode and a button.

2. The scan stand of claim 1, wherein said first mode is a handheld mode and said second mode is a presentation mode.

3. The scan stand of claim 1, wherein said scan stand is powered by an external source.

4. The scan stand of claim 1, wherein said illumination from said illumination system covers an area greater than a field of view of the scanner.

5. The scan stand of claim 1, further comprising multiple scan stand illumination modules.

6. The scan stand of claim 1, wherein said receiving structure comprises a support mechanism to hold said scanner to said scan stand.

7. The scan stand of claim 1, wherein said receiving structure is located on one of a horizontally extending member of the scan stand and a vertical member of the scan stand.

8. The scan stand of claim 1, wherein a communication channel is formed when said scanner is coupled to said scan stand.

9. The scan stand of claim 1, wherein said scan stand activates said scan stand illumination module when said photodiode detects illumination from said scanner.

10. The scan stand of claim 1, wherein said button is positioned in said receiving structure and said scan stand activates said scan stand illumination module when said button is pressed by the insertion of the scanner into said receiving structure.

* * * * *

UNITED STATES PATENT AND TRADEMARK OFFICE
CERTIFICATE OF CORRECTION

PATENT NO. : 7,367,509 B2
APPLICATION NO. : 11/025817
DATED : May 6, 2008
INVENTOR(S) : Patel et al.

It is certified that error appears in the above-identified patent and that said Letters Patent is hereby corrected as shown below:

On the Title Page

Item (52), under "U.S. Cl.", Line 1, delete "235/462.01".

In Column 8, Line 64, in Claim 1, delete "component" and insert -- component, --, therefor.

Signed and Sealed this

Twenty-fourth Day of November, 2009

David J. Kappos
*Director of the United States Patent and Trademark Office*